(12) United States Patent
Anma et al.

(10) Patent No.: US 7,846,290 B2
(45) Date of Patent: *Dec. 7, 2010

(54) METHOD AND APPARATUS FOR MANUFACTURING FRICTION PLATE

(75) Inventors: Satoru Anma, Iwata (JP); Rikiya Takahashi, Fukuroi (JP)

(73) Assignee: NSK-Warner K.K., Tokyo (JP)

( * ) Notice: Subject to any disclaimer, the term of this patent is extended or adjusted under 35 U.S.C. 154(b) by 283 days.

This patent is subject to a terminal disclaimer.

(21) Appl. No.: 12/047,738

(22) Filed: Mar. 13, 2008

(65) Prior Publication Data

US 2008/0210367 A1 Sep. 4, 2008

Related U.S. Application Data

(62) Division of application No. 11/198,173, filed on Aug. 8, 2005, now Pat. No. 7,364,637, which is a division of application No. 09/568,463, filed on May 10, 2000, now Pat. No. 6,939,427.

(30) Foreign Application Priority Data

May 14, 1999 (JP) .................................. 11-133649
Jul. 7, 1999 (JP) .................................. 11-193114

(51) Int. Cl.
*B29C 65/00* (2006.01)
(52) U.S. Cl. .................. 156/265; 156/299; 188/18 A; 188/218 XL
(58) Field of Classification Search .............. 156/250, 156/256, 261, 265, 297, 299; 188/218 XL, 188/18 A
See application file for complete search history.

(56) References Cited

U.S. PATENT DOCUMENTS

| 4,260,047 | A | 4/1981 | Nels |
| 4,674,616 | A | 6/1987 | Mannino, Jr. |
| 5,460,255 | A | 10/1995 | Quigley |
| 5,571,372 | A | 11/1996 | Miyaishi et al. |
| 5,776,288 | A | 7/1998 | Stefanutti et al. |
| 5,897,737 | A | 4/1999 | Quigley |
| 6,019,205 | A | 2/2000 | Willwerth et al. |
| 6,042,935 | A | 3/2000 | Krenkel et al. |
| 6,170,629 | B1 | 1/2001 | Suzuki et al. |
| 6,308,397 | B1 | 10/2001 | Nishimura et al. |
| 6,370,755 | B1 | 4/2002 | Wakamori |
| 6,381,822 | B1 | 5/2002 | Watanabe et al. |
| 6,500,294 | B1 | 12/2002 | Honda et al. |

(Continued)

FOREIGN PATENT DOCUMENTS

EP 0 771 962 5/1997

(Continued)

*Primary Examiner*—John L Goff
(74) *Attorney, Agent, or Firm*—Miles & Stockbridge P.C.

(57) ABSTRACT

A method for manufacturing a friction plate in which a plurality of frictional material segments are adhered to a substantially annular core plate. The method previously registers the frictional material segments to adhesion positions, and presses the core plate to which adhesive agent is applied and the frictional segments to perform temporary adhesion. Further, an apparatus for manufacturing a friction plate in which a plurality of frictional material segments are adhered to a substantially annular core plate. The apparatus comprises a member for registering the frictional material segments while holding the frictional material segments in a state arranged in the adhesion positions.

10 Claims, 8 Drawing Sheets

U.S. PATENT DOCUMENTS

| | | |
|---|---|---|
| 6,572,726 B2 | 6/2003 | Shimoi et al. |
| 6,596,119 B2 | 7/2003 | Honda et al. |
| 6,790,308 B2 | 9/2004 | Murphy et al. |
| 6,939,427 B1 | 9/2005 | Anma et al. |
| 7,364,637 B2 * | 4/2008 | Anma et al. ................ 156/265 |
| 2002/0023701 A1 | 2/2002 | Shimoi et al. |
| 2004/0099271 A1 | 5/2004 | Hardies et al. |
| 2006/0090980 A1 | 5/2006 | Kinoshita et al. |
| 2006/0113023 A1 | 6/2006 | Takahashi et al. |

FOREIGN PATENT DOCUMENTS

| | | |
|---|---|---|
| EP | 1 030 075 | 8/2000 |
| GB | 1 460 592 | 1/1977 |
| JP | 63-77944 | 4/1988 |
| JP | 63-210135 | 8/1988 |
| JP | 63-210136 | 8/1988 |
| JP | 63-210137 | 8/1988 |
| JP | 07-151175 | 6/1995 |

* cited by examiner

METHOD AND APPARATUS FOR MANUFACTURING FRICTION PLATE

CROSS-REFERENCE TO RELATED APPLICATION

This application is a division of application Ser. No. 11/198,173 filed Aug. 8, 2005, now U.S. Pat. No. 7,364,637 which is a division of application Ser. No. 09/568,463 filed May 10, 2000 (now U.S. Pat. No. 6,939,427 issued Sep. 6, 2005).

BACKGROUND OF THE INVENTION

1. Field of the Invention

The present invention relates to a manufacturing method of a friction plate used in a lock-up clutch device or the like which is used in the automatic transmission of a vehicle and a manufacturing apparatus of the friction plate.

2. Related Background Art

Recently, the use of a friction plate obtained by adhering frictional material segments to a core plate has been proposed for the purpose of enhancement in throughput of the frictional material from requirements of the cost reduction. With the proposal of the use of the friction plate, a manufacturing method of the frictional material for adhering the frictional material segments and the manufacturing apparatus thereof have been developed.

In such conventional manufacturing method (and the manufacturing apparatus), a manufacturing method of the friction plate comprising steps of advancing a frictional material at a desired interval to punch so that frictional material segments are obtained and directly press-adhering the frictional material segments to a registered core plate has been known. In this method the punching of the frictional material and the press-adhesion are performed in a series of operations by using the same member and the core plate is indexed (rotated) at a desired angle in accordance with these operations.

FIG. 11 shows a conventional manufacturing apparatus of the friction plate. The manufacturing apparatus thereof will be described below. As shown in FIG. 11, a frictional material 131 advanced at the same pitch with a punching device 100 is punched to obtain a plurality of frictional material segments 132. On the other hand, a circular table 110 has a supporting rest 111 and registers a core plate 121. The frictional material segment 132 obtained with the punching device 100 is punched with a punch 101 in accordance with the shape of a mold 102 and is press-adhered to the core plate 121. The supporting rest 111 is indexed at a desired angle in a range to which the frictional material segments 132 were adhered so as to conform to the operations of the punching and press-adhesion operations. Such kind of conventional techniques include those disclosed in for example Japanese Patent Publication Nos. 4-68491, 4-68492 and 4-68494, and Japanese Laid-Open Patent Application Nos. 7-151175 and 10-318309 and the like.

However, to manufacture a number of friction plates with a higher production efficiency in a short amount of time using these conventional techniques, it is necessary to perform operations of punching, press-adhesion and indexing at a higher speed. Therefore, there are problems such that the pressing time becomes short in the press-adhesion in these series of operations and it is impossible to obtain sufficient adhesion forces. Further, after the press-adhesion of the frictional material segments, the frictional material segments are immediately indexed, whereby position shift of the frictional material segments can easily occur. Thus, it is difficult with conventional methods and devices to increase the speed of manufacturing a friction plate because of the position shift problems associated with speeding up the indexing operations.

SUMMARY OF THE INVENTION

Accordingly, an object of the present invention is to provide a method for manufacturing a friction plate which can enhance the manufacturing efficiency and decrease the production time and which prevents the position shift of a frictional material segment, and to provide the manufacturing apparatus thereof.

To attain the objects, the manufacturing method of the friction plate according to the present application is a method of a friction plate obtained by adhering a plurality of frictional material segments to a substantially annular core plate characterized in that after said frictional material segments are previously registered to adhesion positions, temporary adhesion is carried out by pressing the core plate to which adhesive agent is applied and said frictional material segments.

Further, an apparatus for manufacturing a friction plate of the present application is an apparatus of a friction plate obtained by adhering a plurality of frictional material segments to a substantially annular core plate characterized in that the apparatus includes a member to perform registration of said frictional material segments by holding the frictional material segments in a state where the frictional material segments are arranged at the adhesion positions.

Thus, the manufacturing method of the present invention is carried out by pre-registering the frictional material segment at an adhesion position and carrying out the temporary adhesion by pressing the core plate to which adhesive agent is applied. Further, in this method the frictional material segment is registered to a space where a protrusion extending to the frictional material segment is provided, by inserting the frictional material segment under pressure.

Further, the apparatus which carries out the manufacturing method includes a member for registering the frictional material segment in a state where the frictional material segment is arranged. The member includes a holding rest for placing the frictional material segment and a guide that slides up and down with respect to the holding rest.

Further, the manufacturing apparatus of the frictional material plate according to the present invention comprises steps of previously registering the frictional material segment to an adhesion position and pressing said frictional material segment to said core plate to which adhesive agent is applied to perform temporary adhesion of said frictional material segment.

Further, the manufacturing apparatus of the friction plate according to the present invention includes a member for registering the frictional material segment obtained by punching to a desired position.

The member has a guide that covers the outer periphery of the frictional material segment. This guide is moved down by being pressed against a core plate on the press-adhesion. According to the present invention, registration or positioning of the frictional material segment can be positively performed until the press-adhesion.

BRIEF DESCRIPTION OF THE DRAWINGS

FIG. 3A shows the appearance before the contact of the core plate with the frictional material segment and FIG. 3B shows the appearance after the contact of the core plate with the frictional material segment;

DESCRIPTION OF THE PREFERRED EMBODIMENTS

Figure 1:
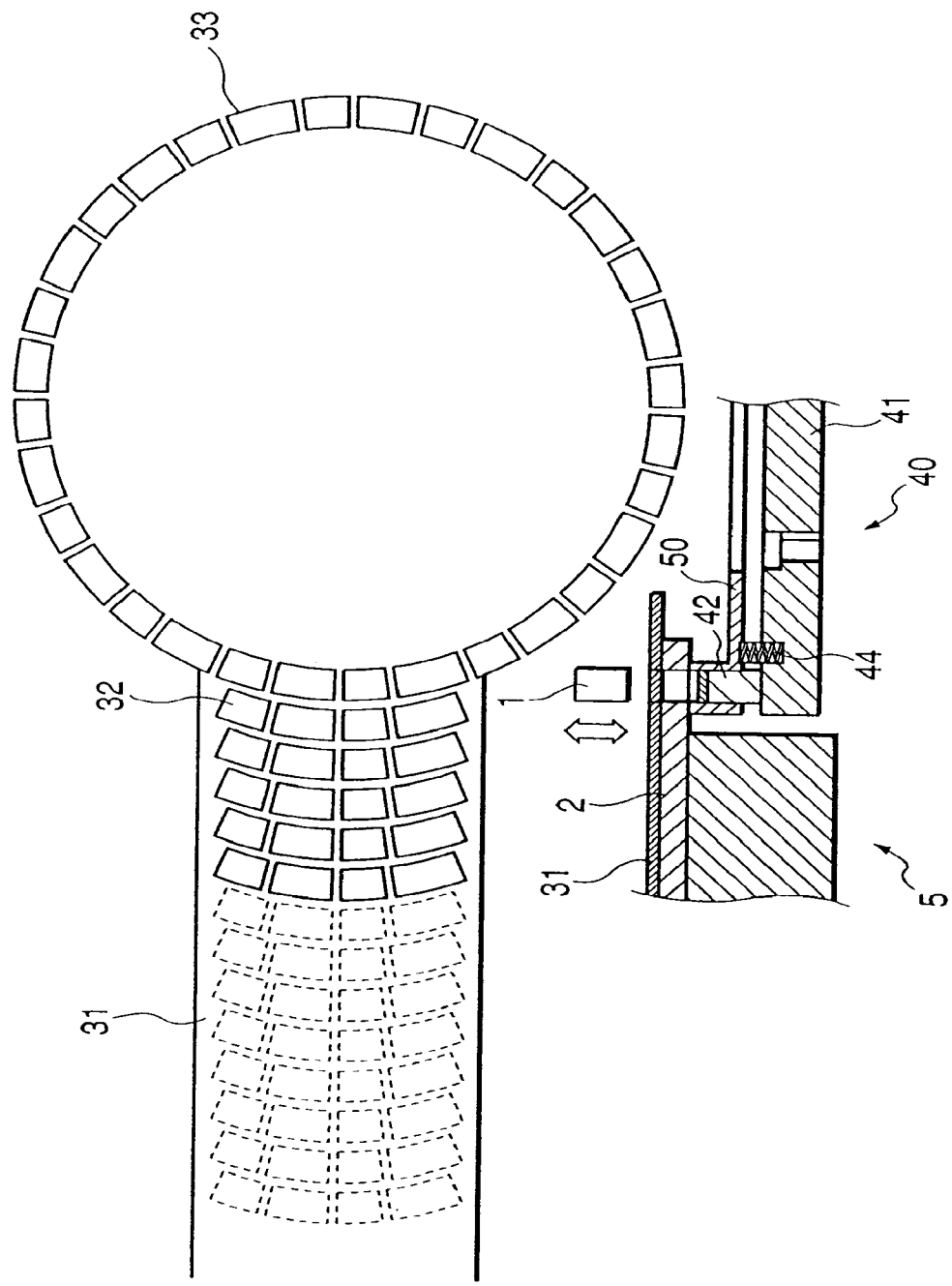
FIG. 1 is a schematic view of a manufacturing apparatus of a friction plate showing one example according to the present invention.

Examples of the invention will be described in detail below with reference to attached drawings. The same portions in the drawings are denoted by the same reference numerals.

FIG. 1 is a schematic view of a manufacturing apparatus of a friction plate showing one example according to the present invention. One example of the manufacturing method of a friction plate according to the present invention will be described below by use of the manufacturing apparatus. Incidentally, it is needless to say that the manufacturing method of the present invention can be also attained with manufacturing apparatus other than the manufacturing apparatus shown in FIG. 1.

Referring to FIG. 1, steps of a manufacturing method of the present invention will be described. A sheet-shaped or band-shaped frictional material 31 is advanced at the same pitch and the frictional material 31 is punched with a press 5 to obtain a plurality of frictional material segments 32. The press 5 includes a mold 2 and a punch 1. After the frictional material segments 32 are once returned to the frictional material 31, they are pressed out from the friction material 31 with the punch 1 and are supplied onto a holding rest 42 of a device (jig) or member 40. In this example, four frictional material segments 32 are simultaneously supplied onto the holding rest 42.

While repeating this operation, the member 40 is indexed (rotated) and desired sheets of the frictional material segments 32 which are adhered to one side of a core plate are held on the holding rest 42 at desired positions. At this time, each frictional material segment 32 is placed with substantially the same spacing and in an annular shape. If the registration or positioning for the one side of the core plate is finished, the frictional material segments are transferred to the next step. Then, a substantially annular core plate 21 (not shown in FIG. 1), to the lower surface of which adhesive agent for temporary adhesion is applied, is pressed from above. The pressing time can be set to the time for indexing numbers of the supply of the frictional material segments 32.

In the present example, the frictional material segments 32 having different lengths in the circumferential direction are adjoined each other so that thirty-two (32) frictional material segments 32 are arranged in an annular shape. Therefore, in this case, eight times indexing is performed for the supply of all frictional material segments 32 for one side of the friction plate. When the pressing is carried out for a longer time than the time required for one time of the indexing operation, the cycle time is increased when using conventional techniques. However, according to the present invention, the press-adhesion of the core plate 21 and the supply of the frictional material segments 32 to the member 40 are performed at separate steps. Thus, even if pressing is performed for the same time as in eight times of indexing operation, the cycle time of the apparatus does not increase. Accordingly, since the pressing time for the frictional material segments 32 can be increased, adhesion and fixation of the frictional material segments 32 to the core plate 21 are enhanced.

For the adhesion of the frictional material to both sides of the core plate 21, after the end of temporary adhesion of the frictional material to one side of the core plate 21, the core plate 21 is reversed and temporary adhesion of the frictional material to the opposite side of the core plate 21 is also performed in the same step as mentioned above. The friction plate obtained after the temporary adhesion is subjected to plenary adhesion by pressing and heating at the next step. Incidentally, as described above, it is preferable that the punching of the frictional material segments 32 are simultaneously performed by a plurality of sheets or a plurality of rows to decrease the indexing numbers. However, the: punching of the frictional material with the punching device 5 may be performed by one row thereof.

Next, a manufacturing apparatus of the friction plate according to the present invention will be described with reference to FIG. 1. In this case an advancement device for supplying the sheet-shaped or band-shaped frictional material 31 is omitted. The punching device (press) 5 includes the punch 1 and the mold 2 and only the outline of the punching device 5 is shown. Known devices can be used as the punching device 5.

FIG. 1 also shows a cross-sectional view of the member 40 for registering a plurality of frictional material segments 32. The member 40 is composed of a base 41 that performs indexing at a desired angle, a holding rest 42 for placing the frictional material segments 32, a guide 50 that guides the frictional material segment 32, and a spring 44 that supports the guide 50 upwardly. In FIG. 1 a state where the frictional material segments 32 are being supplied with the punch 1 which moves in the direction of an arrow.

Figure 2:
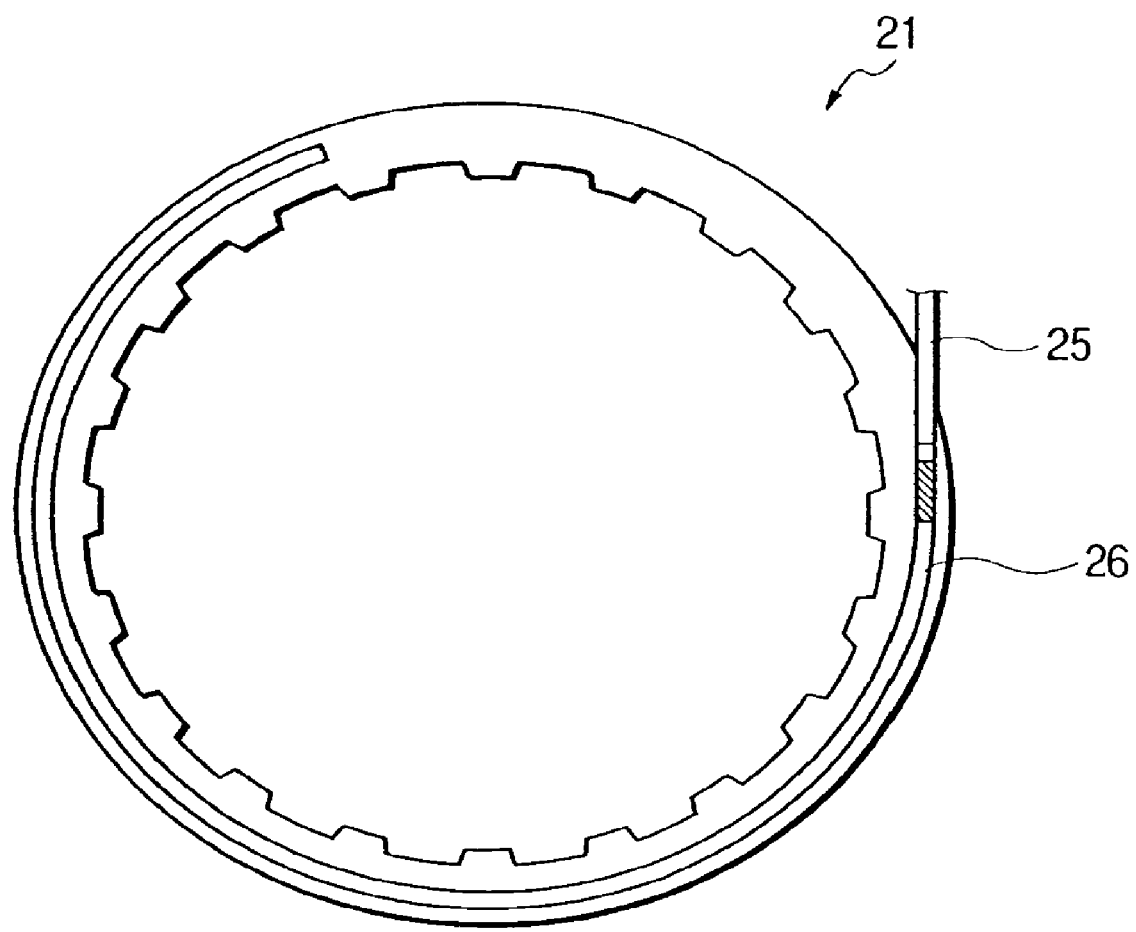
FIG. 2 is a schematic front view showing an appearance in which adhesive agent is applied to a core plate.

As described above, the registration of the frictional material segments 32 is performed in one step, and at the same time adhesive agent for temporary adhesion to the core plate 21 is applied at the other step. FIG. 2 is a schematic front view showing an appearance of applying the adhesive agent to the core plate 21. As shown in FIG. 2, adhesive agent 26 is applied to substantially the center of the adhesion surface of the core plate 21 in the radial direction in a band shape with a device 25. It is preferable that the registration step of the frictional material segment 32 and the application step of the adhesive agent to the core plate 21 are simultaneously carried out in parallel, but their steps may be carried out at different times.

Figure 3A:
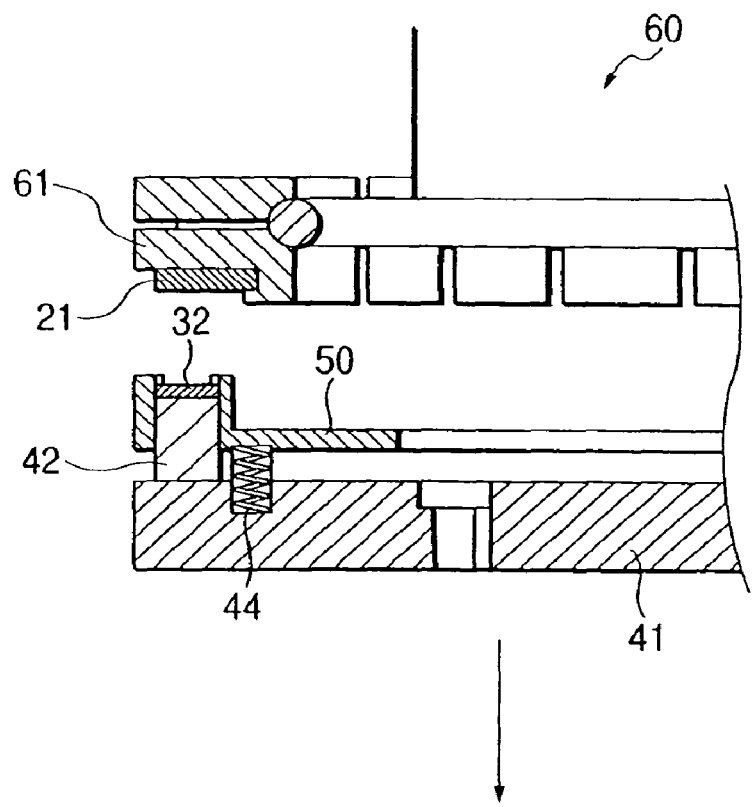
FIG. 3A and FIG. 3B are schematic cross-sectional views showing appearances in which a registered frictional material segment is press-adhered to a core plate to which adhesive agent is applied, and more specifically.
Figure 3B:
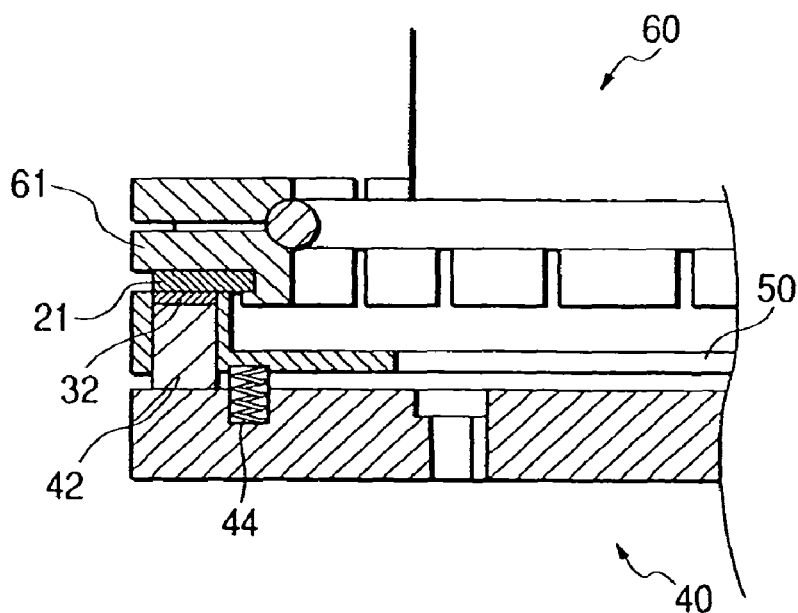

FIG. 3A and FIG. 3B are schematic cross-sectional views showing appearances of adhering the registered frictional material segment 32 under pressure to the core plate 21 on one side (lower surface) of which adhesive agent is applied. The core plate 21 is held with an arm 61 of a transfer device 60. FIG. 3A shows this state. The transfer device 60 presses the core plate 21 from above the registered frictional material segment 32 to temporarily adhere the frictional material segment 32 to the core plate 21. After the temporary adhesion the plenary adhesion is performed under desired heating and pressing thereby to complete a friction plate. It is preferable that the heating and the pressing are simultaneously carried out.

In this method, when the core plate 21 begins making into contact with the top of the guide 50, the spring 44 that supports the guide 50 is constricted. In other words, the top of the guide 50 is placed at a higher position than the frictional material segment 32 until the core plate 21 is lowered to make into contact with the top of the guide 50. That is, the top of the holding rest 42 is placed at a lower position than the top of the guide 50. When the transfer device 60 is further lowered, the upper surface of the frictional material segment 32 and the top of the guide 50 are placed at the same level. FIG. 3B shows this state. When the transfer device 60 is moved upward after the transfer device 60 caused the core plate 21 to impart a desired pressing force to the frictional material segment 32, the frictional material segment 32 is in a state where it has been already adhered to the core plate 21. Thus, the frictional material segment 32 can be removed from the member 40 with the core plate 21 adhered to the frictional material segment 32.

Figure 4:
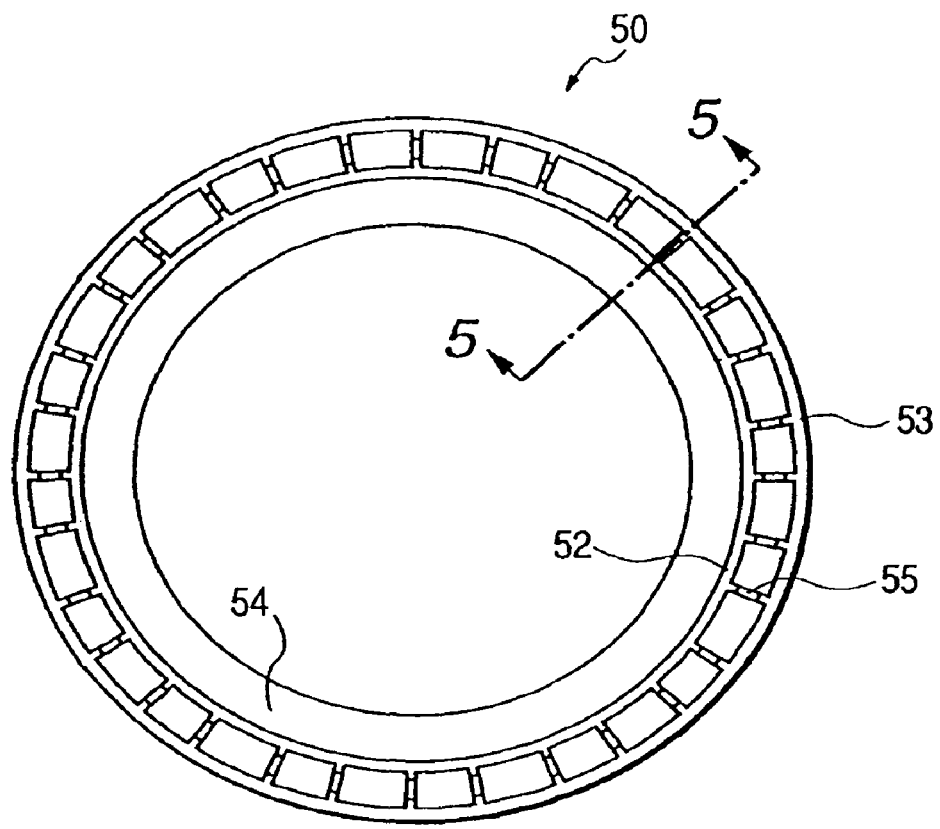
FIG. 4 is a top view of a guide of an example according to the present invention.
Figure 5:
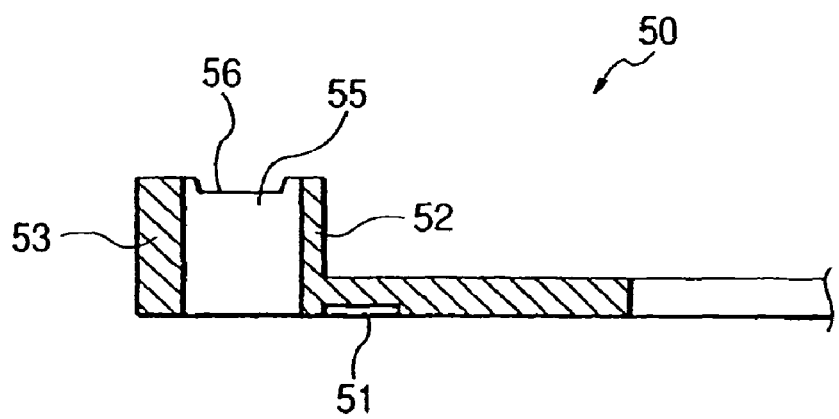
FIG. 5 is a 5-5 cross-sectional view of FIG. 4.

FIG. 4 and FIG. 5 show the guide 50 in detail. Specifically, FIG. 4 is the top view of the guide 50, and FIG. 5 is a cross-sectional view taken along line 5-5 in FIG. 4. As shown in FIG. 5 the guide 50 is composed of a substantially annular inner circumference wall 52, a substantially annular outer circumference wall 53, a concave portion 51 to which the leading end of the spring 44 is fitted, a plurality of partition walls 55 circumferentially arranged, and a substantially annular ring portion 54 (FIG. 4) which is continuous to the inner circumference wall 52. The partition wall 55 has a recess portion 56. This recess portion 56 is provided as a relief for preventing the adhesion of the adhesive agent to the guide 50 during the press-adhesion of the core plate 21.

As shown in FIG. 4 the partition walls 55 of the guide 50 correspond to the arrangement of the frictional material segments 32 as shown in FIG. 1 such that the frictional material segments frictional material segments having completely the same lengths may be properly arranged. In this case, the partition walls 55 are arranged in the circumferential direction with the same pitches.

To an annular space defined by the inner circumference wall 52 and the outer circumference wall 53 of the guide 50 is fitted the holding rest 42 on which the frictional material segment 32 is placed. Further, a plurality of grooves each of which has a desired width in the circumferential direction and penetrates in the radial direction can be formed between the adjacent frictional material segments. This groove functions as a lubricating path or a lubricating oil reservoir of lubricating oil for the friction plate and a multi-plate clutch in which the friction plate is used.

As described in the above examples, when the frictional material segment 32 is placed in the space, that is, the cavity, the position of the frictional material segment in the cavity can be shifted due to the relationships between the cavity and the frictional material segment. Therefore, a protrusion protruding with respect to the frictional material segment is provided on the inner wall of the guide. The width between the leading ends of the protrusions is set to a width slightly narrower than that of the frictional material segment. As a result, the frictional material segment is placed in such a state as to be inserted into the cavity under pressure by the support of this protrusion. Accordingly, the registration of the frictional material segment can be accurately performed.

Figure 6:
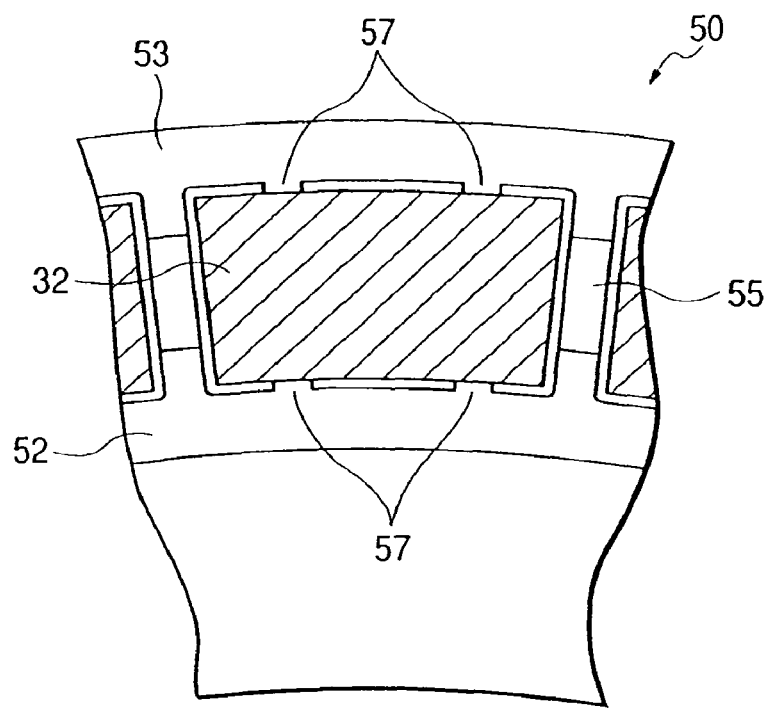
FIG. 6 is an enlarged view showing a state of registration of the frictional material segment by extrusions.

The example in which this protrusion is provided is shown in FIG. 6 to FIG. 9. In the cavity of the guide 50, where the frictional material segment 32 is placed, is provided a protrusion 57 as shown in FIG. 6. The width of the cavity formed between the leading ends of the protrusion extending in the radial direction with respect to the frictional material segment 32 is slightly smaller than the radial width of the frictional material segment 32. Therefore, the frictional material segment 32 is placed in the cavity by insertion under pressure. As a result, the registration of the frictional material segment can be performed with higher precision. In this example, two protrusions 57 are provided in the circumferential direction and two protrusions opposite to each other in the radial direction are provided. Thus a total of four protrusions are provided. Incidentally, when the protrusion is provided on one side of the frictional material segment 32, it is preferable that the preset tolerance of the protrusion is in a range of from −0.1 to 0 mm, and when provided on both sides thereof it is preferable that the preset tolerance of the protrusion is in a range of from −0.2 to 0 mm.

Figure 7:
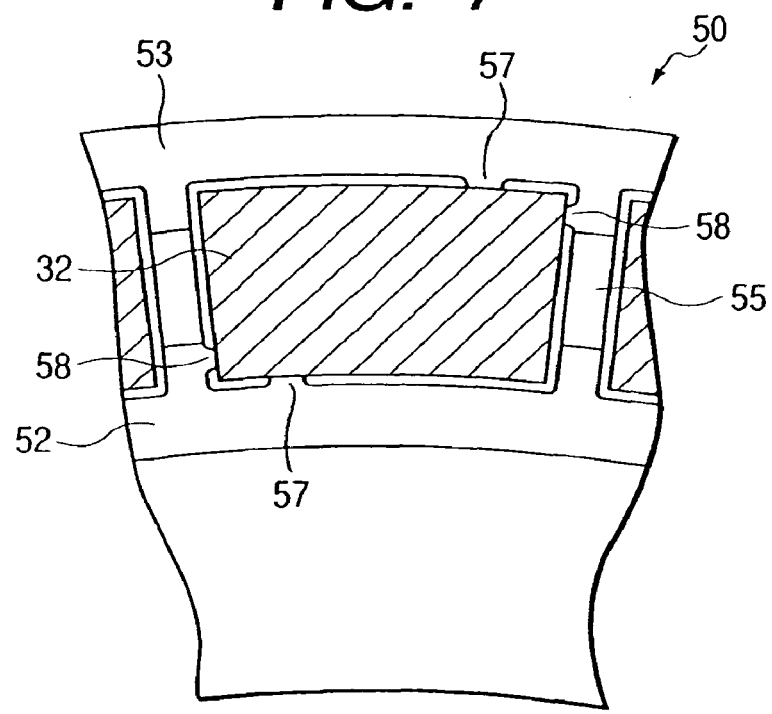
FIG. 7 is an enlarged view showing another state of registration of the frictional material segment by extrusions.
Figure 8:
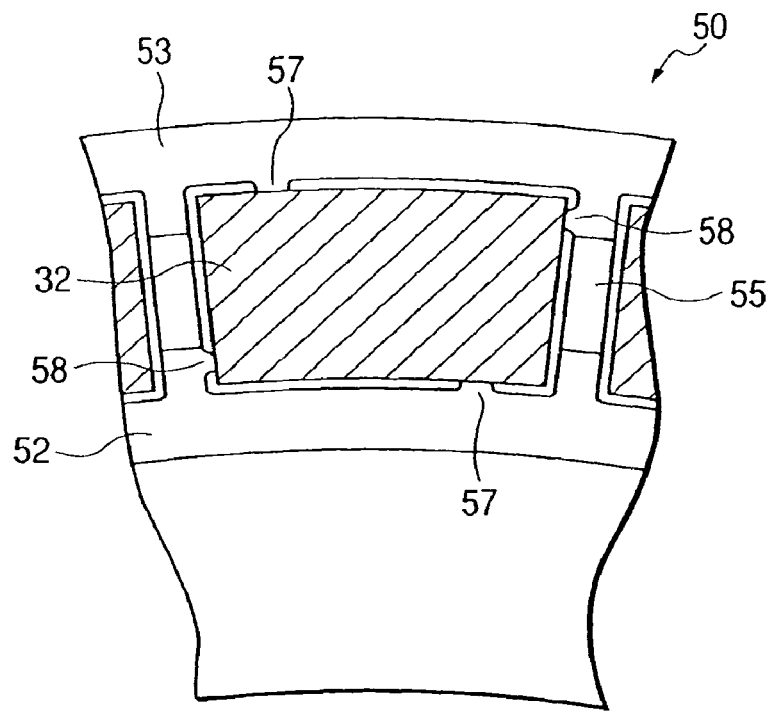
FIG. 8 is an enlarged view showing still another state of registration of the frictional material segment by extrusions.
Figure 9:
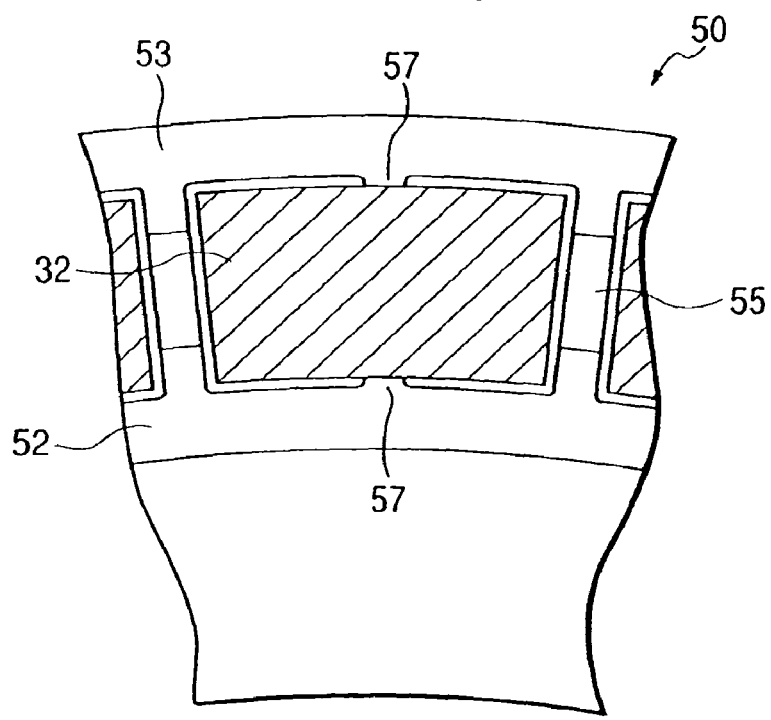
FIG. 9 is an enlarged view showing still another state of registration of the frictional material segment by extrusions.

FIG. 7 is a view showing another embodiment of the protrusion. The frictional material segment 32 is registered by combination of the protrusions 57 protruding in the radial direction and the protrusions 58 protruding in the circumferential direction with respect to the frictional material segment 32. In FIG. 7 the protrusions 57 and 58 are respectively provided on two corners on a diagonal line. FIG. 8 shows still another embodiment of the protrusion. In FIG. 8 the protrusions 57 in the radial direction are provided on different corners from the protrusions 58 with the respect to the frictional material segment 32. FIG. 9 shows still another embodiment of the protrusion. In FIG. 9 the protrusions 57 are provided by only one on each side in the radial direction of the frictional material segment 32. The protrusions 57 and 58 are not limited to the positions, the numbers and the combination shown in FIGS. 6 to 9, and of course can take other embodiments.

Figure 10:
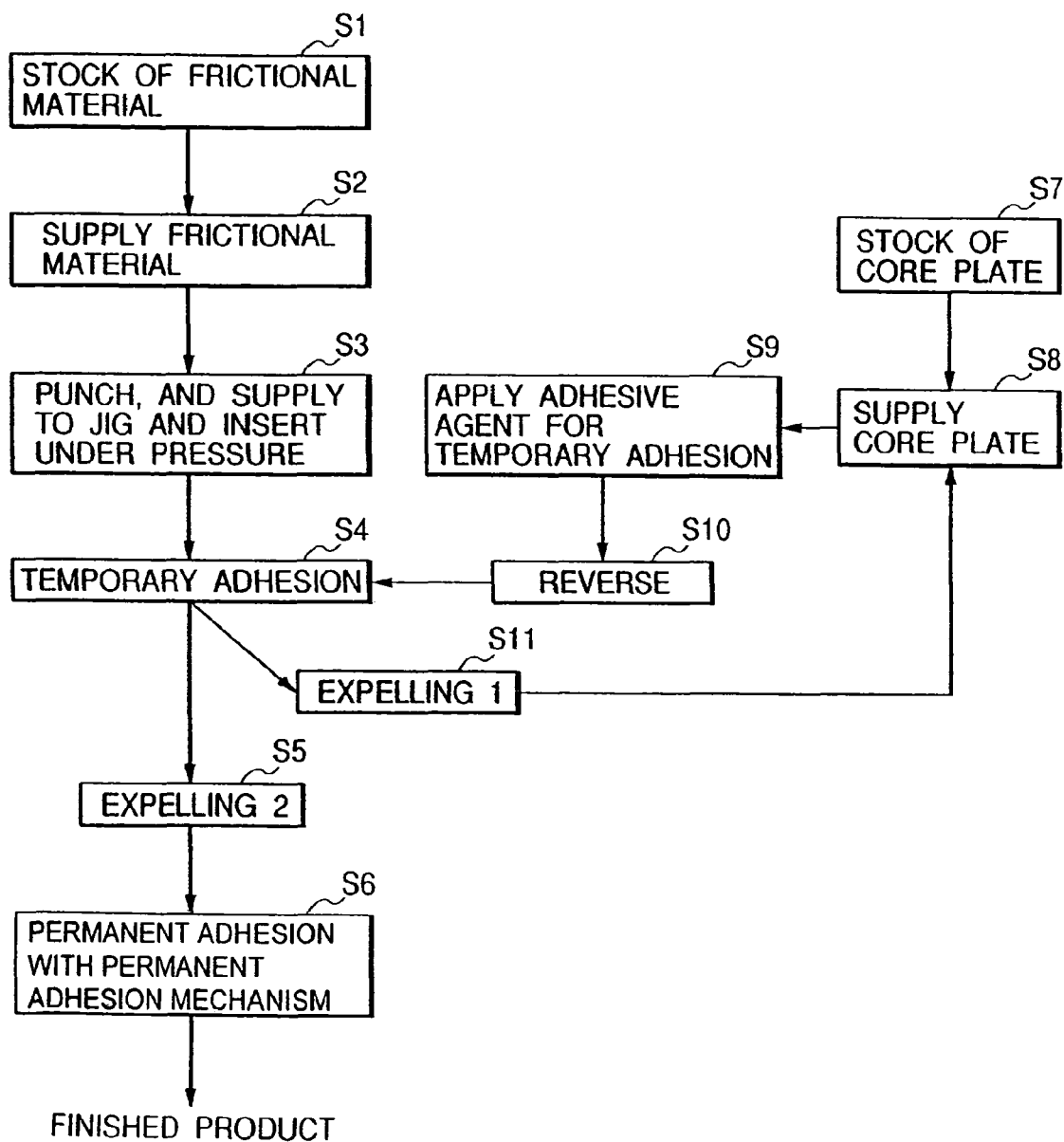
FIG. 10 is a flow chart showing a flow of production steps of a friction plate applicable to each example of the present invention.
Figure 11:
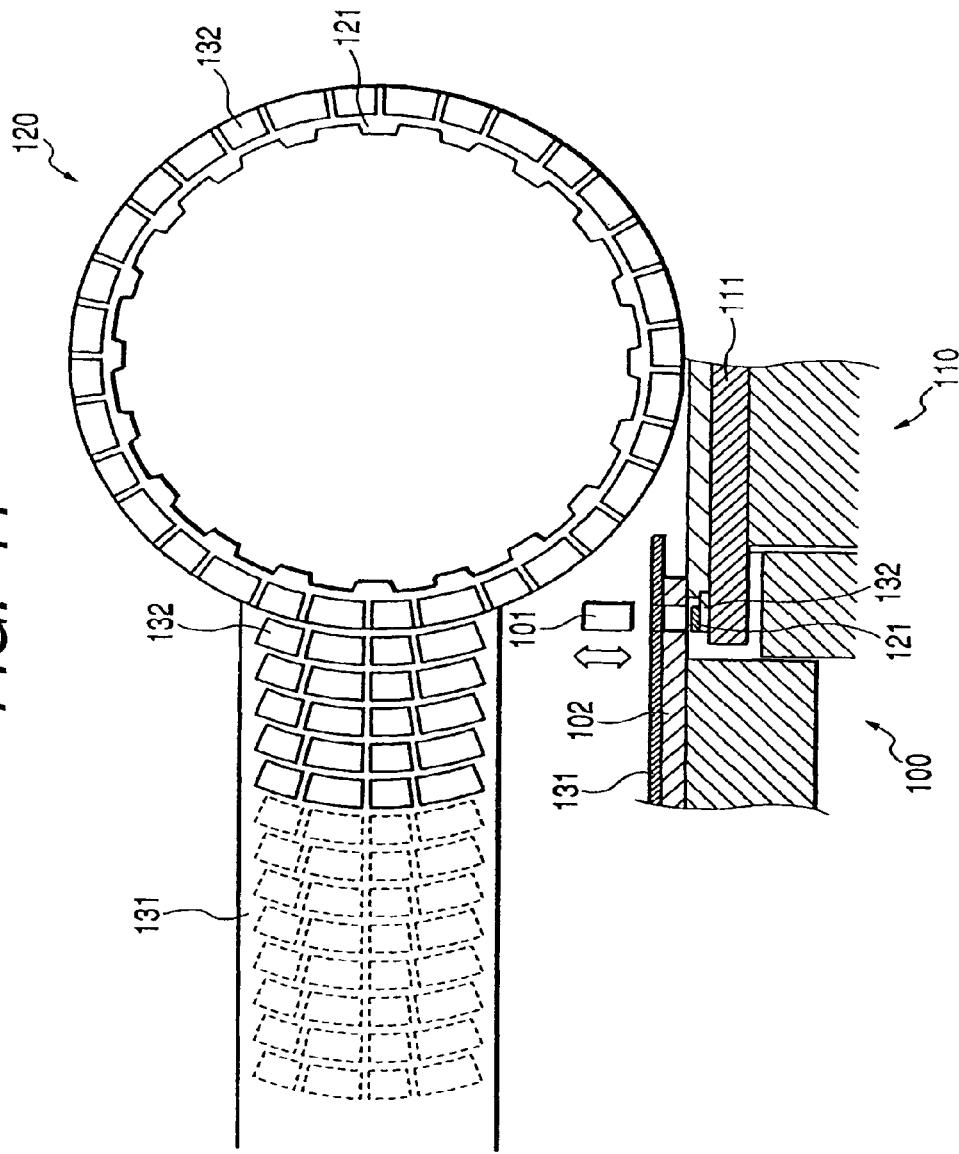
FIG. 11 is a schematic view of a manufacturing apparatus of a conventional friction plate.

FIG. 10 is a flow chart showing a flow of production steps of the friction plate applicable to each example of the present invention. In FIG. 10 at step S1 a desired amount of the frictional materials 31 are stocked in a frictional material supply source not shown. Then, at step S2 the frictional material 31 is supplied to the member 40 with an advancement device not shown. Further, at step S3 the frictional material segments 32 are punched from the frictional material 31 with the punching device (press) 5, and the punched frictional material segments 32 are supplied to the member 40. After that the frictional material segments 32 are inserted in the guide 50 under pressure for registration.

In parallel to steps S1 to S3, the core plate 21 to which the frictional material segments 32 are adhered is prepared. At step S7 a desired amount of the core plates are stocked in a core plate supply source not shown. At step S8 the core plate 21 is supplied to the application position of adhesive agent with the transfer device 60. At step S9 the adhesive agent for temporary adhesion is adhered to the upper surface, that is, one side of the core plate 21. After that, at step S10 the core plate 21 is reversed and the adhesive agent-applied side becomes the underside. The reversed core plate 21 is transferred to a position where the temporary adhesion of the core plate 21 with the frictional material segments 32 is carried and at step S4 the core plate 21 is pressed against the frictional material segment 32, whereby the temporary adhesion is performed.

After the completion of the temporary adhesion at step S4, the core plate to which the frictional material segments 32 were temporarily adhered is transferred to step S6 where the plenary adhesion is performed with an expelling mechanism not shown at step S5. At step S6 the plenary adhesion is carried out under pressure and heating so that the frictional material segments are positively fixed to the core plate thereby to complete a friction plate.

Incidentally, in a case where the friction plate in which the frictional material segments 32 were adhered to both sides of the core plate is manufactured, after the temporary adhesion at step S4 the core plate to one side of which the frictional material segments were adhered is returned to the core plate supply position at step S8 by the expelling step at step S11. The adhesive agent for temporary adhesion is then applied to the upper surface of the core plate 21 at step S9 (the frictional material segments had been already adhered to the lower plate of the core plate) and the core plate 21 is reversed at step S10. After that, at step S4 temporary adhesion is performed and the core plate 21 is returned to the plenary adhesion step that is step S6. In this case, the core plate supply at step S8 is carried out as follows. That is, the core plate stocked to step S7, to both sides of which the frictional material segments were adhered, and the core plate expelled from the step S11, to only one side of which the frictional material segments were adhered, are alternately supplied at step S8.

In the above-described examples, four frictional material segments were arranged at the same time and a total of 32 frictional material segments were placed by eighth time indexing. However, the number of the frictional material segments 32 is not limited to 32. For example, an arcuate frictional material segment having the circumferential length of four frictional magnetic segments shown in FIG. 1 can be placed on the core plate 21. Further, needless to say, that the number of the indexing time for one orbit of the core plate 21 can be optionally set in accordance with the number of the frictional material segments or the size of the frictional material segment. Further, in the above-mentioned examples, the press-adhesion is performed while lowering the core plate. However, on the contrary, temporary adhesion may be performed by elevating the member holding the frictional material segments at desired positions with reference to the core plate held with the arm to press the core plate.

According to the manufacturing methods of the friction plate and the manufacturing apparatus thereof of the present invention, the following effects can be obtained.

According to the present invention, the position shift of the frictional material segment can be prevented before temporary adhesion. Further, it is not necessary to perform the indexing operation of the core plate after the temporary adhesion. Additionally, since the pressing time for the temporary adhesion can be increased, the effect to prevent the position shift of the frictional material segment can be obtained. Further, the friction plate in which the frictional material segments were adhered to a correct positions can be obtained, and the time to supply the frictional material segments to the member can be decreased.

Further, a device in which the position shift of the frictional material segment does not occur before temporary adhesion can be obtained and the registration or positioning of the frictional material segments can be made with higher precision. Thus, the core plate can be sufficiently pressed against the registered frictional material segments and then adhesion of adhesive agent for the temporary adhesion to the guide can be prevented.

What is claimed is:

1. A method for manufacturing a friction plate in which frictional material segments are adhered in a predetermined annular arrangement to a substantially annular core plate, said method comprising steps of:
   (a) pre-registering a predetermined number of said frictional material segments in accordance with said predetermined annular arrangement by placing each friction material segment in a cavity of a registering member, said cavity having a protrusion extending toward said frictional material segment so as to engage a periphery of said frictional material segment, the predetermined number of frictional material segments corresponding to a total number of frictional material segments to be adhered to one side of the core plate in said predetermined annular arrangement; and
   (b) pressing and fixing all of said frictional material segments placed in said registering member simultaneously to the one side of the core plate coated with an adhesive.

2. A method according to claim 1, wherein said registering member is rotationally indexable, and said registering member is rotated with a predetermined index to place said frictional material segments.

3. A method according to claim 1, wherein said registering member has guide portions to cover an outer periphery of each pre-registered frictional material segment.

4. A method according to claim 1, wherein the pre-registered frictional material segments include segments of different sizes and shapes.

5. A method according to claim 1, wherein after punching frictional material segments from a sheet-like or belt-like frictional material, the punched frictional material segments are returned to the frictional material, and then conveyed to said registering member and advanced by a punch mechanism to insert the predetermined number of frictional material segments into said registering member.

6. A method according to claim 5, wherein said conveyance, advancement and insertion are continuously performed.

7. A method according to claim 1, wherein a second predetermined number of frictional material segments to be adhered to an opposite side of the core plate are pre-registered in accordance with step (a), and wherein the second predetermined number of frictional material segments are pressed and fixed to the opposite side of the core plate in accordance with step (b).

8. A method according to claim 7, wherein an orientation of the core plate is reversed between the pressing and fixing of the first predetermined number of frictional material segments and the pressing and fixing of the second predetermined number of frictional material segments.

9. A method according to claim 1, wherein step (b) is performed without heating.

10. A method according to claim 1, wherein step (b) is performed with heating.

* * * * *